(No Model.)

W. B. MANN.
BICYCLE TIRE.

No. 587,656. Patented Aug. 3, 1897.

WITNESSES:
Chas. P. Heinemann
Charles B. Mann Jr.

INVENTOR:
William B. Mann
By Chas. B. Mann
ATTORNEY.

THE NORRIS PETERS CO., PHOTO-LITHO., WASHINGTON, D. C.

UNITED STATES PATENT OFFICE.

WILLIAM B. MANN, OF BALTIMORE, MARYLAND.

BICYCLE-TIRE.

SPECIFICATION forming part of Letters Patent No. 587,656, dated August 3, 1897.

Application filed January 7, 1897. Serial No. 618,291. (No model.)

*To all whom it may concern:*

Be it known that I, WILLIAM B. MANN, a citizen of the United States, residing at Baltimore, in the State of Maryland, have invented certain new and useful Improvements in Bicycle-Tires, of which the following is a specification.

This invention relates to the application of elastic tires to vehicle-wheels, and aims to provide an effective connection between the tire and the wheel-rim without the use of metallic fastenings, cement, or other permanent means of attachment, with the advantage of securing increased elasticity in the tire, greater ease of application thereof to the rim, and such a connection between the rim and tire as will resist ordinary displacing strain but will yield to such an extraordinary strain as would result disastrously with any kind of a permanent fastening.

In carrying out the above-stated object I form or provide the tire with a series of elastic protuberances on its side which engage the rim and make in the latter a corresponding series of sockets to receive the protuberances, the arrangement being such that in the seating of the tire on the rim the protuberances are pressed against the bottoms of the sockets, so as to expand the protuberances laterally against the sides of the sockets and thereby produce such an engagement between the sides of the protuberances and the sides of the sockets as to resist any tendency to lateral displacement and also displacement by a direct outward strain and also to prevent the circumferential movement of the tire called "creeping."

It is preferable to provide in the formation or location of the protuberances and sockets for an obliquity of their engaging sides with respect to a central plane bisecting the tire longitudinally, for thereby the resistance to displacement is materially increased.

The idea above expressed may be embodied in various forms, and the accompanying drawings, which constitute part of this specification, illustrate several.

Figure 1:
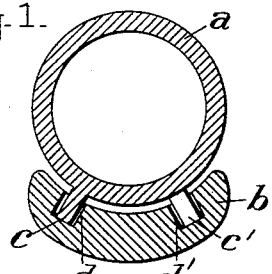
Figure 2:
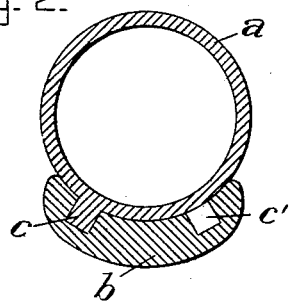
Figure 3:
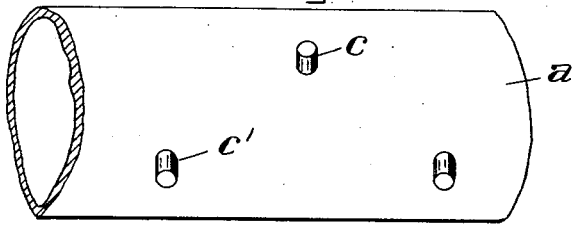
Figure 4:
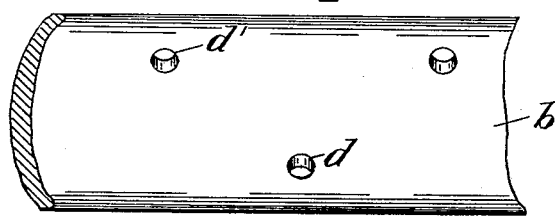
Figure 9:
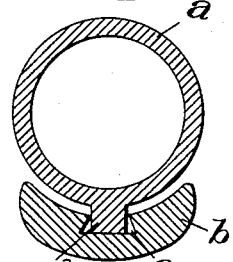
Figure 10:
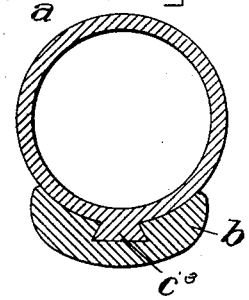

Of said drawings, Figure 1 shows a cross-section of a pneumatic tire and rim embodying one form of the invention, the tire being represented as deflated. Fig. 2 shows a similar view with the tire fully inflated. Fig. 3 shows an elevation of a section of the tire, looking at the inner side thereof. Fig. 4 shows an elevation of a section of the rim, looking at the concaved outer side thereof. Figs. 5, 6, 7, and 8 show views corresponding with Figs. 1, 2, 3, and 4 of a different form of embodiment of the invention. Figs. 9 and 10 show views corresponding with Figs. 1 and 2 and 5 and 6 of another form of embodiment of the invention.

In all the figures the letter $a$ designates a single-tube pneumatic tire, and $b$ the concaved rim of a wheel in which said tire seats.

Referring now more particularly to Figs. 1 to 4, the letters $c$ $c'$ designate protuberances on the tire preferably integral therewith and produced in the molding of the tire. These protuberances, it will be observed, are in two series $c$ $c'$, extending longitudinally of the tire, and they all project radially, so that their sides are oblique to a plane longitudinally bisecting the tire. In the concave face of the rim $b$ I make two longitudinally-extending series of sockets $d$ $d'$, corresponding in location and obliquity of sides with the aforesaid protuberances on the tire and designed to receive the same when the tire is applied to the rim.

It is to be particularly noted that the protuberances exceed in length the depth of the sockets, so that with the ends of said protuberances resting against the bottoms of the sockets and the tire deflated, as shown in Fig. 1, the tire does not seat upon the concavity of the rim. It will also be observed that in the deflated condition of tire the protuberances do not completely fill the sockets. When, however, the tire is inflated, the protuberances are forced hard against the bottoms of the sockets, and consequently shorten, and thereby are caused to expand laterally, and thus fill the sockets, and the tire then seats upon the concavity of the rim, as illustrated in Fig. 2. It will now be seen that such engagement between the tire and rim is brought about as to effectually resist any tendency to lateral displacement of the tire and also to resist a direct outward pull, this being due principally to the before-described obliquity of the sockets and protuberances producing a dovetail or undercut engagement. At the same time creeping of the tire is prevented, as is obvious. The smaller normal diameter of the protuberances as compared with the sockets facilitates their engagement therewith in the application of the tire, as will be apparent, and yet when the tire is expanded the protuberances are no longer smaller than the sockets. I prefer to locate the protuberances $c$ of one series opposite the spaces between the protuberances $c'$ of the other series, as clearly illustrated in Fig. 3, the sockets in the rim being correspondingly located, as shown in Fig. 4, so that the wood of the rim will not be appreciably weakened by boring and because it is found to give a more stable connection between the tire and rim than the same number of protuberances and sockets with the members of one series directly opposite those of the other and for the further reason the protuberances are more readily entered in the sockets.

Figure 5:
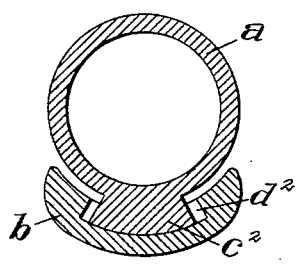

In the form of embodiment of the invention illustrated by Figs. 5 to 8 instead of two series of radially-projecting protuberances I provide the tire with a single longitudinal series of protuberances $c^2$ of considerable diameter and make a corresponding series of sockets $d^2$ in the rim. The same obliquity of the sides of the protuberances and the sockets, as before described, exists here, this obliquity being effected by making the protuberances of a flaring form and the sockets with a corresponding undercut. As before, the extent of projection of the protuberances from the tire exceeds the depth of the sockets, and with the tire deflated, as shown in Fig. 5, the protuberances do not entirely fill the sockets; but under pressure exerted by injection of compressed air into the tire the protuberances are caused to spread, and thereby completely fill the sockets by reason of their being against the bottoms of the sockets. The smaller normal diameter of the protuberances relative to the diameter of the sockets makes it easier to introduce them into the sockets.

It will be observed that in both forms of embodiment of the invention thus far described the oblique engagement between the protuberances and the sockets is carried as far as practicable toward the edges of the rim, which insures a firmer engagement between the tire and rim and a greater purchase of the tire and the rim to resist roll or lateral displacement. At the same time the full elasticity of the entire circumference of the tube is utilized because of the absence of cement as a permanent or rigid connection between the tube and rim, which obviously would confine the elasticity to that portion of the tube not cemented or permanently attached.

Figure 6:
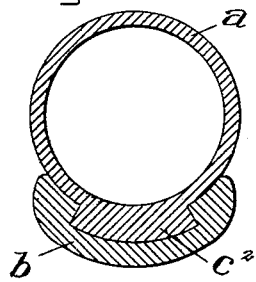
Figure 7:
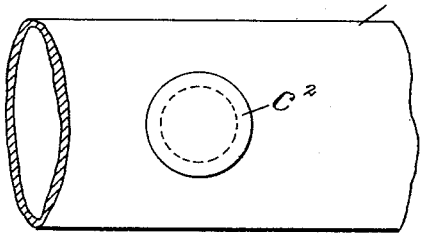
Figure 8:
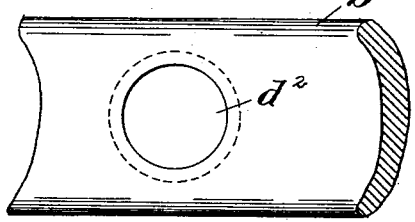

In the form of embodiment of the invention shown in Figs. 9 and 10 a single series of protuberances $c^3$ is employed, differing from those shown in Figs. 5 to 7 in that their sides are not flaring. The rim is made with a series of undercut sockets $e$, and, as in both the above-described forms of embodiment of the invention, the protuberances exceed in length the depth of the sockets, so that when the tire is inflated the consequent pressure of the protuberances against the bottoms of the sockets will cause the said protuberances to expand or spread out into the undercut portions of the sockets, as shown in Fig. 10.

It will be seen that in each form of embodiment of the invention here shown and described the feature of obliquity in the engaging sides of the protuberances and sockets with respect to a plane longitudinally bisecting the tire is present, and also the feature of effecting engagement of the oblique sides by pressure of the protuberances against the bottoms of the sockets.

Having thus set forth my invention and explained several forms of embodiment thereof without confining myself to any one form of embodiment, what I claim as new and patentable is as follows:

1. In a vehicle-wheel, the combination of a rim having in its concaved outer face a longitudinal series of bottomed sockets; and an elastic tire adapted to seat against the concaved outer face of the rim and having a series of elastic protuberances corresponding in location with the series of sockets and adapted to engage the same, the said protuberances being of reduced diameter as compared with the sockets and of greater length than the depth of the latter, substantially as and for the purpose described.

2. In a vehicle-wheel, the combination of a rim having in its concaved outer face a longitudinal series of bottomed sockets with sides oblique to the radial plane of the wheel; and an elastic tire adapted to seat against the concaved outer face of the rim and having a series of elastic protuberances corresponding in location with the series of sockets and adapted to engage the same, the said protuberances being of reduced diameter as compared with the sockets and of greater length than the depth of the latter, substantially as and for the purpose described.

3. In a vehicle-wheel, the combination of a rim having in its concaved outer face a longitudinal series of bottomed sockets with sides oblique to the radial plane of the wheel; and an elastic tire adapted to seat against the concaved outer face of the rim and having a series of elastic protuberances corresponding in location and obliquity of sides with the series of sockets and adapted to engage the same, the said protuberances being of reduced diameter as compared with the sockets and of greater length than the depth of the latter, substantially as and for the purpose described.

4. In a vehicle-wheel, the combination of an elastic tire having a longitudinal series of flaring elastic protuberances on the inner side; and a rim having a longitudinal series of undercut sockets to receive said protuberances, the latter being of reduced diameter as compared with the sockets and of greater length than the depth of said sockets, substantially as and for the purpose described.

In testimony whereof I affix my signature in the presence of two witnesses.

WILLIAM B. MANN.

Witnesses:
CHAPIN A. FERGUSON,
CHARLES B. MANN, Jr.